Oct. 24, 1950 — R. M. SHIRK — 2,526,701
CATALYTIC CONVERSION OF HYDROCARBONS
Filed May 7, 1948
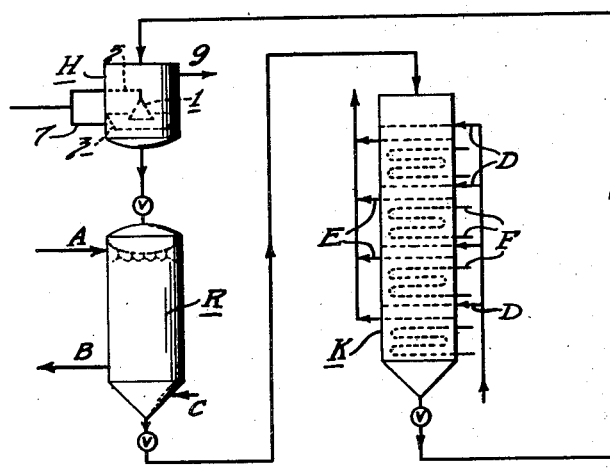
*Fig. 1*
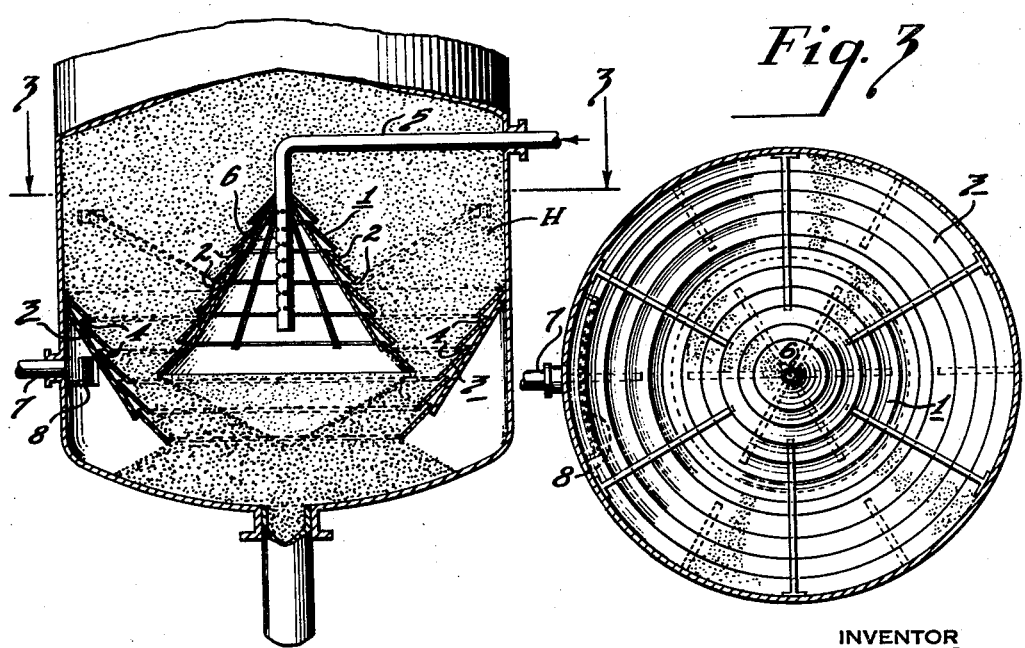
*Fig. 2*
*Fig. 3*
INVENTOR
Robert M. Shirk
BY
Gordon C. Kessler
ATTORNEY Patented Oct. 24, 1950

2,526,701

UNITED STATES PATENT OFFICE 2,526,701

CATALYTIC CONVERSION OF HYDROCARBONS

Robert M. Shirk, Wilmington, Del., assignor to Houdry Process Corporation, Wilmington, Del., a corporation of Delaware Application May 7, 1948, Serial No. 25,595

4 Claims. (Cl. 252—410)

The present invention has to do with chemical reactions which are conducted in the presence of a solid contact mass, such as for example, the catalytic conversion of hydrocarbons and is particularly concerned with improved methods and apparatus for carrying out such reactions. Important typical reactions wherein the invention finds use are in catalytic cracking of heavy hydrocarbons and in the upgrading of the quality of hydrocarbon distillates such as gasoline and naphthas by treatment with cracking catalysts at elevated temperature.

Among the known operations of the type described are those wherein natural or synthetic solid catalyst particles at temperatures above about 800° F. are contacted with the hydrocarbon charge stocks essentially in vaporized form in a reaction zone, to accomplish the desired chemical conversion of the hydrocarbons, and the catalyst is then transported to a separate zone for regeneration by burning of combustible deposit formed therein during the preceding hydrocarbon conversion operation. Siliceous catalysts employed in the described operations include synthetic silica-alumina-gels and certain acid-activated sub-bentonite clays, such as "Super Filtrol." Each of these types of catalysts has its own particular advantages and both types are widely employed in commercial operations. The advantages of the present invention are more fully realized when active clay catalysts are employed and the description which follows accordingly will be chiefly devoted to hydrocarbon conversion operations employing such clay catalysts.

It has been observed that when a calcined or otherwise dehydrated active clay catalyst is treated with steam at temperatures in the order of 700° F. and above, the heat of hydration due to absorption of steam by the clay gives rise to an increase in temperature of about 50 to 100° F. During regeneration of the catalyst containing coke from the hydrocarbon conversion step, in normal operation the catalyst is subjected to temperatures in the order of 800–1200° F. and sometimes above, and it is contacted with moving gases which effect substantial dehydration of the catalyst. In this dehydrated condition clay catalyst can readily take on moisture until it reaches its saturation point, which point will vary for any given clay catalyst with the temperature.

In the catalytic cracking and treating of corrosive petroleum charge stocks, such as stocks of high sulfur content (those containing above about 1% sulfur in free and combined form) or other stocks having smaller sulfur content in highly reactive form, it has been observed that commercial clay catalysts, such as the acid-activated sub-bentonites, are impaired in activity at an abnormal rate. This abnormal aging of the clay catalyst by sulfur compounds at the high temperatures of these hydrocarbon conversion operations, it has been found, can be largely reduced by prehydration of the catalyst with steam. To obtain the full beneficial protective effect of the steam, there should be employed a quantity of steam sufficient to substantially saturate the catalyst to its adsorption capacity at the temperature prevailing. For active clay catalysts of the type described and at conventional operating temperatures employed of about 700 to 1100° F., this requires an amount of steam constituting about 1.5 to 2.5% by weight of the catalyst.

The required amount of steam, for saturation of clay catalysts to obtain the beneficial effects of the steam treatment in catalytic conversion of corrosive stocks as well as in the cracking of ordinary stocks wherein the heat of wetting of the clay by the steam is employed to useful advantage, can be provided in certain conventional systems employing moving catalyst beds by contacting the catalyst with steam at one or more points in the system shortly prior to contact with the hydrocarbon vapors, as well as in some instances by the addition of steam to the hydrocarbon vapors subjected to cracking. The quantity of steam that can be thus furnished in a system of given operating capacity is limited by practical operating considerations, and accordingly if catalyst flow rates are increased beyond certain limits in such a system, the desired steaming of the catalyst can not be successfully accomplished.

In accordance with the present invention, provision is made for adequate prehydration of clay catalyst in connection with processes of hydrocarbon conversion, circulating comparatively large quantities of catalyst, thereby enabling operation of such processes at relatively high catalyst to oil ratios. Such adequate prehydration of the catalyst is made possible by a particular manner of contacting the catalyst with steam before the catalyst is admitted to the principal hydrocarbon conversion reaction, and is accomplished by the dissemination of the steam in a plurality of low velocity streams into contact with the catalyst as the latter moves through an enlarged accumulation zone or feed hopper preceding the principal reaction zone. The invention provides distinct advantages in the operation of hydrocarbon conversion processes wherein catalyst to oil ratios of about 3 and above are employed and is of particular importance with still higher catalyst to oil throughput ratios, as in the order of 5 or more.

By "catalyst to oil ratio" is meant the ratio of the weight of catalyst (fresh and regenerated) admitted to a reactor per unit weight of hydrocarbons charged thereto in the same given period.

The invention will be fully understood from the detailed description read in connection with the accompanying drawing showing a particular form of apparatus which may be used in practical operation of a hydrocarbon conversion system embodying the invention.

In the drawing, Figure 1 is a diagrammatic flow chart illustrating a typical system embodying the invention; Figure 2 is a partial view in longitudinal cross-section of one form of construction that may be employed for admission of steam to the catalyst hopper; Figure 3 is a transverse cross-section taken on the lines 3—3 of Figure 2.

The flow diagram in Figure 1 is applicable to a large number of known and certain commercially employed systems wherein the catalyst in the form of discrete pieces such as pellets or coarse granules is circulated downwardly through the reactor R as a compact moving bed which is contacted with hydrocarbon vapors. In the concurrent flow type reactor the hydrocarbon vapors, with or without added steam, are admitted at a point represented at A and the cracked (or other conversion) products are removed at a lower point in the reactor as illustrated at B, suitable provision being made for vapor disengagement.

The catalyst separated from the hydrocarbon vapors is then discharged from the reactor, passing in transit through a purging zone where it is contacted with nonreactive gas to free the catalyst of any adsorbed or entrained hydrocarbon vapors. The purging gas is admitted as represented at C at a point below that at which principal disengagement of hydrocarbons from the catalyst takes place. The purging gas may be steam or other nonreactive gas such as flue gas which may be derived as a by-product fluid from another point in the system.

The catalyst discharged from the reactor contains therein a combustible carbonaceous or hydrocarbonaceous deposit called "coke," as a by-product of the hydrocarbon conversion process, which deposit as it accumulates lowers the activity of the catalyst. The catalyst from the reactor is therefore passed to a regeneration zone for removal of this combustible deposit. Thus, the coke-containing catalyst is introduced into a kiln K as shown in Figure 1 of the drawings, wherein it is contacted during one or more stages of treatment with air or other combustion-supporting gas. In a typical system, for instance, the contaminated catalyst is passed by gravity through a vertical kiln wherein it is contacted with upwardly flowing regenerating gas introduced at several vertically spaced points along the longitudinal length of the kiln, as illustrated at D, combustion products or flue gas also being withdrawn at a number of spaced points along the longitudinal length of the kiln, as illustrated at E, to waste or to provide the flue gas for desired use elsewhere in the system. To prevent detrimentally high temperatures being generated in the kiln from the burning of the combustible deposit in the catalyst, suitable cooling means are provided therein at several levels, as for instance by banks of indirect heat exchanging tubes F circulating water or other heat exchanging fluid. The regenerated catalyst is subsequently returned to the reactor for further use therein, being first introduced into a supply hopper H communicating with the reactor.

The type of system thus far described is generally well known in the art; further details of suitable construction of one form of kiln being described in Simpson et al. U. S. 2,417,399 of March 11, 1947. The reactor and kiln may be placed side by side and the catalyst conveyed by separate mechanical conveyors such as bucket elevators from the bottom of the reactor to the top of the kiln and from the bottom of the kiln to the reactor supply hopper. A simplified system involves the use of a single elevator provided with partitioned buckets and suitable mechanism for discharging contaminated catalyst from the buckets to the kiln and freshly regenerated catalysts from the buckets into the supply hopper communicating with the reactor. Systems employing this type of single elevator are described, for example in Oil and Gas Journal, August 16, 1947, at page 78 and following and in Petroleum Refiner, December, 1947 at page 85 and following.

Instead of placing the reactor and kiln side by side, they may be located one over the other in either order, as illustrated for instance in U. S. patent to Simpson et al., U. S. 2,320,318. In practice of the present invention, in any of the systems indicated, however, it is important that the catalyst supply hopper (feeding to the reactor) wherein the steaming operation hereinafter described takes place, be located at a point in the cycle of movement of the catalyst between the kiln and the reactor, whether the reactor is located beside, above, or below the kiln. Advantageously, however, in any of the suggested alternatives, the catalyst supply hopper referred to is located directly above the reactor so as to feed the catalyst to the reactor by gravity.

Instead of employing mechanical elevators for transportation of catalyst between reaction and regeneration zones, pneumatic conveying systems may be employed, with particular advantage in operations involving high catalyst flow rates such as in those operations utilizing catalyst to oil throughput ratios of 5 or more. Suitable arrangements of systems employing pneumatic elevators are illustrated in the U. S. patent to Prickett 2,289,329 of July 7, 1942 and the U. S. patent to Simpson et al. No. 2,331,433 of October 12, 1943.

Coming now to the description of the novel steaming arrangement of the invention which is more particularly illustrated in Figures 2 and 3 of the accompanying drawing. The hopper proper, such as shown generally at H, is provided with an upright hollow conical member 1, louvered as shown at 2, the slope of the lateral wall of the cone being such that retention of catalyst thereon is opposed; that is, the base angle is greater than the normal angle of repose of the moving catalyst. Inclined inwardly and downwardly from the wall of the reactor an inverted frusto-conical baffle 3 is shown; this baffle is also provided with louvered openings 4 and is inclined at a suitable angle overcoming tendency for repose of catalyst thereon. Steam is introduced in large volumes into the expansion space within the hollow conical member as by means of a conduit 5 having a vertically and downwardly disposed leg portion 6 terminating within the hollow space inside of the conical member 1. Although in some instances a required quantity of steam may be effectively introduced through an open end at the terminus of the vertical leg 6, better steam distribution without danger of excess velocities is obtained by provision of perforations in the vertical leg 6. Steam thus introduced through the conduit 5 and leg 6 passes into contact with descending catalyst through the lovered openings 2 in the conical member 1.

Additional steam is introduced through a duct 7 at a lower point in the hopper, the steam entering the expansion space formed between the baffle 3 and the interior of the hopper wall proper and issuing through the louvered openings 4 in the baffle 3, into contact with the catalyst gravitating through the hopper. To prevent streams of steam at high velocity escaping through the louvered openings 4, which might cause interference with catalyst flow or attrition of catalyst, a suitable barrier is provided as shown at 8 operating as a guard against which the stream of steam admitted through the duct 7 is directed. The conical member 1 in addition to providing good distribution of the steam through the louvered openings therein with low catalyst attrition rates, also serves to protect the vertical leg 6 from erosion which might otherwise result from constant bombardment of catalyst against the leg.

In the practical operation of the described arrangement, the quantity of steam introduced through the conduits 5 and 7 is a least sufficient to effect the desired prehydration of the catalyst, saturating the same to the extent of its adsorptive capacity. Excess steam which is not adsorbed may be discharged from hopper H together with the catalyst into the reactor R or may be removed entirely or in part as by means of a vent at the upper part of the hopper as illustrated at 9 (Figure 1).

In using a pneumatic lift, as diagrammatically represented at L, for transportation of catalyst between reaction and regeneration zones, any suitable gas or vapor may be employed which is not incompatible with the catalyst in its condition during such transportation. If required, provision may be made in known manner for disengaging the lift gas or vapor from the catalyst at the discharge end of the lift, so as not to interfere with the succeeding reaction.

It will be understood that the flow diagram of Figure 1 is merely diagrammatic and that in practice the catalyst transporting means will be appropriately located between the reactor and the kiln, whether a mechanical elevator or pneumatic lift is employed, with catalyst transfer lines being made as short as possible utilizing gravity flow in charging and discharging the lift or elevator.

The following is an example of a typical operation in the cracking of a hydrocarbon charge stock embodying described features of the invention. The catalyst employed is commercial acid-activated sub-bentonite clay, such as "Super Filtrol," in the form of pellets of 4 mm. diameter and 4 mm. length. The catalyst is used in cracking of a petroleum charge stock such as a heavy gas oil boiling in the range of about 550–950° F.; catalyst flow rates are employed giving rise to a catalyst-to-oil ratio of about 5. The cracking operation is carried out at about 900° F. employing low super-atmospheric pressure (5 to 20 p. s. i.). The regenerated catalyst as discharged from the kiln K normally contains moisture in the order of less than about ½ to 1% by weight. To saturate the catalyst to its capacity at the indicated reaction temperature of the cracking operation, about 1 to 1.8% moisture can still be added thereto, which addition will effect an elevation of the catalyst temperature in the order of about 50 to 100° F.

In a typical system capable of circulating about 700 tons of clay catalyst per hour the hopper will be designed to have a capacity of about 60 to 200 tons or more. The quantity of steam required to add 1 to 1.5% moisture by weight of the catalyst circulated through the hopper will be in the order of 14,000 to 21,000 pounds of steam per hour. The steam is supplied at a pressure somewhat above that existing in the hopper and at about 275° F. Higher steam temperatures may be employed, if desired, up to or even above the catalyst temperature.

The catalyst in a typical operation is discharged from the kiln cooled to temperature lower than the maximum regeneration temperature reached therein. By steaming in the reactor hopper H, the catalyst as above pointed out, is raised in temperature 50 to 100° F. at which elevated temperature it is brought into contact with the cooler hydrocarbon charge, heating the latter to desired reaction temperature. For instance, hydrocarbon vapors at 800 to 850° F. may be contacted with steamed catalyst at 950 to 1000° F. to obtain an average reaction temperature of about 900° F. or somewhat above.

The described operation above is merely exemplary. It will be understood that the operating conditions can be varied over a wide range, depending within limits upon the nature of the charge stock and the character of cracked products desired. Additional steam may be introduced with the charge stock to be cracked particularly to assist in vaporization of heavy components which are not otherwise vaporized at the charging temperature.

Obviously, many modifications and variations of the invention as hereinbefore set forth may be made without departing from the spirit and scope thereof and therefore only such limitations should be imposed as are indicated in the appended claims.

I claim as my invention:

1. The process of hydrating a moving body of clay catalyst with steam, which comprises flowing said body of catalyst as a compact bed in a generally downward direction, diverging the flow of catalyst outwardly from the center of the bed at a position along the path of downward flow of said catalyst and for a vertical distance of substantial extent to provide within the bed a central downwardly diverging conical space free from catalyst, diverging the flow of catalyst inwardly from the outer periphery of the bed at a position along said path of catalyst flow and for a substantial vertical distance at least partially horizontally opposite to said central conical space, thereby forming a downwardly converging annular mass of flowing catalyst having a lateral inner face and an oppositely sloped lateral outer face, directing the flow of catalyst inwardly at a point below the base of said conical space to form directly below said conical space a mass of catalyst having an upwardly concaved engaging surface, introducing steam into said bed of catalyst by flowing said steam at low velocity into engagement with said catalyst at a plurality of vertically spaced levels along both of said lateral faces from opposed directions and by passing steam into engagement with catalyst from said conical space through said upwardly concaved engaging surface, passing the steam thus introduced through the entire depth of the compact catalyst bed above the region of introduction of such steam, and discharging unadsorbed steam above the top of said bed, whereby the flowing body of catalyst can be readily hydrated with comparative large quantities of steam at low steam flow velocities not materially interfering with the downward movement of the body of catalyst.

2. In combination with a reaction vessel, a feed hopper for solid contact material communicating with said reaction vessel, a hollow upright open-bottom substantially conical member in said hopper, said conical member having longitudinally spaced ports and the periphery of the base of said conical member being spaced from the surrounding lateral wall of said hopper, a baffle member in said hopper provided with longitudinal spaced ports, said baffle member extending inwardly and downwardly from the surrounding wall of said hopper and opposing said conical member over at least a portion of the length of said conical member to form between said members a restricted path for flow of solid contact material, said baffle member extending for a distance below the base of said conical member, means for introducing steam internally of said conical member, additional means for introducing steam into the space formed between said baffle member and the interior of the surrounding wall of the hopper, whereby a portion of the steam thus introduced will be disseminated through the ports of the conical member and through the ports of the baffle member into contact with solid contact material in said path between said conical member and said baffle member.

3. The combination in accordance with claim 2 wherein said upright conical member is provided with a longitudinally extending perforated pipe passing downwardly through the apex of said member and into the interior of said member, constituting the defined means for introducing steam internally of said conical member.

4. The combination in accordance with claim 2 wherein said means for introducing steam into the space formed between said baffle member and the hopper wall as defined, comprises a duct extending outwardly from the hopper wall, said duct being in communication with an external steam supply, and a guard member provided within said space and opposing said duct to prevent direct forceful impingement of steam against said baffle member.

ROBERT M. SHIRK.

REFERENCES CITED

The following references are of record in the file of this patent:

UNITED STATES PATENTS

| Number | Name | Date |
|---|---|---|
| 1,558,119 | Sherban | Oct. 20, 1925 |
| 2,178,750 | Garland | Nov. 7, 1939 |
| 2,416,230 | Simpson | Feb. 18, 1947 |
| 2,419,519 | Evans | Apr. 22, 1947 |
| 2,429,359 | Kassel | Oct. 21, 1947 |

OTHER REFERENCES

"Cracking Sulphur Stocks with Natural Catalyst," by Davidson, Petroleum Refiner, Sept. 1947 (vol. 26, No. 9).